(12) United States Patent
Shin et al.

(10) Patent No.: US 7,739,190 B2
(45) Date of Patent: Jun. 15, 2010

(54) ELECTRONIC SETTLEMENT SYSTEM, ELECTRONIC SETTLEMENT METHOD AND CASH PAYING METHOD USING LCD BARCODE DISPLAYED ON MOBILE TERMINAL

(75) Inventors: Young-Cheol Shin, Seoul (KR); Chang-Hwan Oh, Daejeon (KR); Hyuck-Jin Kwon, Daejeon (KR); Doo-Seop Eom, Daejeon (KR)

(73) Assignees: Pantech & Curitel Communications, Inc., Seoul (KR); Secubay Corp., Daejeon (KR)

( * ) Notice: Subject to any disclaimer, the term of this patent is extended or adjusted under 35 U.S.C. 154(b) by 1294 days.

(21) Appl. No.: 10/475,414

(22) PCT Filed: Apr. 23, 2002

(86) PCT No.: PCT/KR02/00745

§ 371 (c)(1),
(2), (4) Date: Oct. 22, 2003

(87) PCT Pub. No.: WO02/086785

PCT Pub. Date: Oct. 31, 2002

(65) Prior Publication Data

US 2004/0148253 A1    Jul. 29, 2004

(30) Foreign Application Priority Data

Apr. 23, 2002    (KR) ............... 2001-21791

(51) Int. Cl.
*G06F 17/60* (2006.01)
(52) U.S. Cl. .............................. 705/39; 705/35
(58) Field of Classification Search ............ 705/1–80; 235/380; 719/209
See application file for complete search history.

(56) References Cited

U.S. PATENT DOCUMENTS 6,877,661 B2 * 4/2005 Webb et al. ............ 235/462.01
2002/0126780 A1 * 9/2002 Oshima et al. ............. 375/347

FOREIGN PATENT DOCUMENTS

JP        11-045366        2/1999

(Continued)

OTHER PUBLICATIONS

Dr. Peter Green; A Barcode Primer for Manufacturers; Aug. 27, 2001; BellHawk System Corporation; pp. 1-8.*

(Continued)

*Primary Examiner*—James P Trammell
*Assistant Examiner*—Marissa Liu
(74) *Attorney, Agent, or Firm*—H.C. Park & Associates, PLC

(57) ABSTRACT

Disclosed are an electronic settlement system, an electronic settlement method, and a cash payment method using a LCD barcode displayed on a mobile terminal, thereby simply performing member identification using the LCD barcode including member information, electronic settlement services (such as credit card settlement, direct payment card settlement, advance payment card settlement, small amount settlement, and Giro system settlement) at various shops via a procedure verifying whether a user is an actual owner of the barcode, cash payment services via member information barcode and member identification procedures, advance payment card services by depositing a designated amount of money at a database of the bank and allowing the user to systematically use the advance card within the deposited money, and wireless banking services for transmitting and receiving various banking related data via wireless network between the bank and the members.

8 Claims, 7 Drawing Sheets

FOREIGN PATENT DOCUMENTS

| | | | |
|---|---|---|---|
| JP | 11045366 A | * | 2/1999 |
| JP | 2000-227937 | | 8/2000 |
| JP | 2001-005883 | | 1/2001 |
| JP | 2001005883 A | * | 1/2001 |
| KR | 10-2000-0037046 | | 7/2000 |
| KR | 2000-0037046 | | 7/2000 |
| KR | 2001-0008131 | | 2/2001 |
| KR | 2002-0004103 | | 1/2002 |

OTHER PUBLICATIONS

Chinese Office Action dated Sep. 14, 2007.

* cited by examiner

ELECTRONIC SETTLEMENT SYSTEM, ELECTRONIC SETTLEMENT METHOD AND CASH PAYING METHOD USING LCD BARCODE DISPLAYED ON MOBILE TERMINAL

CROSS REFERENCE TO RELATED APPLICATIONS

This application is the National Stage of International Application No. PCT/KR02/00745, filed on Apr. 23, 2002, and claims priority from and the benefit of Korean Patent Application No. 2001-21791, filed on Apr. 23, 2001, which are both hereby incorporated by reference for all purposes as if fully set forth herein.

TECHNICAL FIELD

The present invention relates to an electronic settlement system using a LCD barcode displayed on a mobile terminal such as a mobile telephone terminal, a PDA (Personal Digital Assistant), or a pager, and more particularly to an electronic settlement system, an electronic settlement method, and a cash payment method using a LCD barcode displayed on a mobile terminal, thereby simply performing member identification using the LCD barcode including member information, electronic settlement services (such as credit card settlement, direct payment card settlement, advance payment card settlement, small amount settlement, and Giro system settlement) at various shops via a procedure verifying whether a user is an actual owner of the barcode, cash payment services via member information barcodes and member identification procedures, small amount settlement services for settling traffic expenses and for use of a vending machine without coins, advance payment card services by depositing a designated amount of money at a database of a bank and allowing a member to systematically use the advance card within the deposited money, and wireless banking services for transmitting and receiving various banking related data via wireless network between the bank and the members.

BACKGROUND ART

Conventionally, an electronic settlement service system employs a credit card in a form of a magnetic card, and an electronic small amount settlement service system employs a smart card formed by installing a IC chip in a mobile telephone. In the credit card settlement system, information about a member is stored by a credit settlement terminal installed at a shop or a cash dispenser, and then read by a card reader of the credit settlement terminal or the cash dispenser. The credit settlement terminal or the cash dispenser transmits the read information to a bank system via a PSTN (public switched telephone network), thereby providing credit card services to the member. On the other hand, in the smart card settlement system in which the IC chip is installed within the mobile telephone, data corresponding to a designated amount of money is stored in the IC chip. Therefore, whenever the member settles the small amount of money using the smart card, the amount of money is deducted from the stored total amount. Therefore, if stored total amount of the money is completely spent, the IC must be recharged.

The aforementioned conventional systems have several problems as follows. First, it is not easy to possess a plurality of the magnetic cards. As the number of banks for which a member registers increases, the number of cards issued by different banks and then possessed by the member also increases, thereby causing an inconvenience and increasing the possibility of loss. Particularly, the number of cards possessed by one member, including department cards and customer management cards at each shop as well as the bank credit cards, drastically increases, thereby being difficult in management.

Second, in case of the smart card, the IC chip for storing electronic currency is installed within the mobile terminal, thereby increasing the production cost of the mobile terminal. Further, after the stored money is completely spent, the IC chip must be recharged, thereby making the member to go to a charging station and generating an inconvenience to the member. Further, a cash payment service cannot be provided to the member via the smart card system.

Third, since the conventional credit card service system cannot receive various messages from banks or department stores, it cannot various banking services. For example, when a member wants to receive banking services such as a money transfer from an account to another account, the member needs to visit the corresponding bank or use other media such as telephone and Internet. Further, in case of introducing new products of the banks or the department stores, the magnetic card cannot transmit and receive various service related messages.

Fourth, since the credit card service using the magnetic card and the smart card service using the IC chip are two separate services, it is difficult to integrate two services one thing, thereby causing complicate matters to the members. For example, in order to use the small amount settlement service, the member must possess the smart card installed on the mobile terminal. On the other hand, in order to use the cash payment service, the credit card service, etc., the member must possess the bank card in a form of the magnetic card separately from the mobile terminal. Therefore, it is impossible to provide an integrated banking service to the members.

DISCLOSURE OF THE INVENTION

Therefore, the present invention has been made in view of the above problems, and it is an object of the present invention to provide an electronic settlement system, an electronic settlement method, and a cash payment method using a LCD barcode displayed on a LCD window of a mobile terminal such as a cellular phone, a PDA (Personal Digital Assistant), or a pager, thereby removing the conventional inconvenience in possession and danger in loss of credit cards and the conventional inconvenience in recharge in smart cards, promoting wireless banking services via wireless network, and integrating the credit card service as settlement means and the smart card service as electronic currency means.

According to one aspect of the present invention, there is provided an electronic settlement system using a barcode stored in a mobile terminal, the electronic settlement system comprising: a mobile terminal for receiving LCD barcode via wireless Internet, storing and displaying the LCD barcode; a bank server system for creating individual barcodes for each member, storing the created barcode into database, transmitting the created barcode to the corresponding mobile terminal upon member registration, and transmitting a result of the user's identification and a settlement authentication upon requests for user's identification and settlement; and a barcode scanner for reading the LCD barcode of the mobile terminal; a shop client system for transmitting user's identification and settlement data including a total amount to be settled and a member's password as well as the read LCD barcode to the bank server system, requesting the bank server system to identify the user and to settle the amount, being notified of the result of the user's identification and the settlement authentication by the bank server system, performing the settlement transaction, and outputting a settlement slip.

According to another aspect of the present invention, the electronic settlement system further comprising a cash payment client system for transmitting cash payment data including a total amount to be paid and a member's password as well as the read LCD barcode to the bank server system, requesting the bank server system to identify the user and to verify the possibility of cash payment, being notified of the result of the user's identification and the result of the verification of the cash payment possibility by the bank server system, performing the cash payment transaction, and outputting a detailed statement for payment.

According to another aspect of the present invention, there is provided an electronic settlement method using a barcode stored in a mobile terminal, the electronic settlement method comprising the steps of: (a) inputting the barcode stored by the member's mobile terminal, a member's password, and total amount to be settled, wherein the barcode is conferred the registered member and transmitted to the mobile terminal of the registered member; (b) transmitting the inputted barcode data, the member's password, and the total amount to be settled to the bank server system, and requesting the bank server system to settle the total mount; (c) verifying the member's settlement possibility upon receiving a request for the electronic settlement from a shop client system, and then in case the settlement is possible, performing the settlement and transmitting settlement completion data to the requested shop client system or in case the settlement is impossible, transmitting settlement impossibility data to the requested shop client system; and processing the settlement transaction in case the settlement completion data are transmitted to the requested shop client system, or displaying the reason of the settlement impossibility via a screen in case the settlement impossibility data are transmitted to the requested shop client system.

According to another aspect of the present invention, there is provided a cash payment method using a LCD barcode stored in a mobile terminal, said cash payment method comprising the steps of: (a) inputting the barcode stored by the member's mobile terminal, a member's password, and total amount to be paid, wherein the barcode is conferred the registered member and transmitted to the mobile terminal of the registered member; (b) transmitting the inputted barcode data, the member's password, and the total amount to be paid to the bank server system, and requesting the bank server system to pay the total mount of cash; (c) verifying the member's cash payment possibility upon receiving a request for the cash payment from a cash payment client system, and then in case the cash payment is possible, transmitting cash payment possibility data to the requested cash payment client system or in case the cash payment is impossible, transmitting cash payment impossibility data to the requested cash payment client system; and processing the cash payment in case the cash payment possibility data are transmitted to the requested cash payment client system, or displaying the reason of the settlement impossibility via a screen in case the settlement impossibility data are transmitted to the requested cash payment client system.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
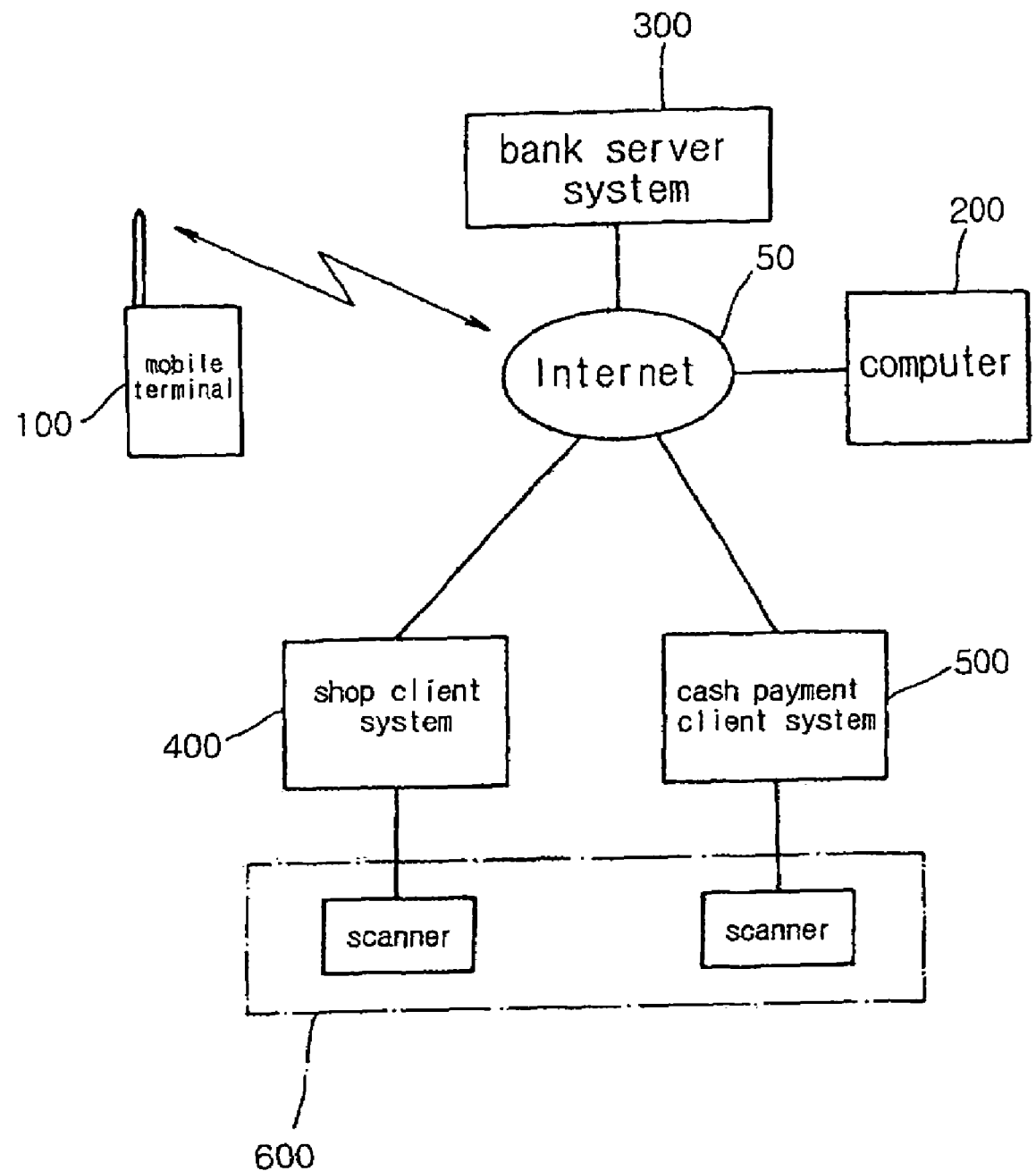
FIG. 1 is a schematic view of an electronic settlement system using a LCD barcode displayed on a mobile terminal in accordance with the present invention.

Now, an electronic settlement system using a LCD barcode displayed on a mobile terminal in accordance with the present invention will be described in detail with reference to the accompanying drawings. In the drawings, elements having the same or similar configurations and functions are denoted by the same reference numerals even though they are depicted in different drawings.

In the electronic settlement system of the present invention, a mobile terminal 100, a computer 200, a bank server system 300, a shop client system 400, and a cash payment client system 500 are connected together via cable and wireless Internet.

FIG. 1 is a schematic view of the electronic settlement system using the LCD barcode displayed on the mobile terminal in accordance with the present invention. With reference to FIG. 1, the electronic settlement system of the present invention comprises the mobile terminal 100, the computer 200, the bank server system 300, a barcode scanner 600, and the shop client system 400, and the cash payment client system 500. Users register for the electronic settlement system to become members of the system of the present invention using the mobile terminal 100 via wireless Internet. Further, the mobile terminal 100 serves to receive and store the LCD barcode via wireless Internet. The users also register for the electronic settlement system to become members of the system of the present invention using the computer 200 via Internet. When the users register for the electronic settlement system of the present invention, the bank server system 300 creates individual barcodes for each member and transmits the created barcodes to the mobile terminal 100 of the corresponding member. Further, when the bank server system 300 receives a request for user's identification and a settlement request, the bank server system 300 responds to each request and transmits a result of the user's identification and a settlement authentication. The scanner 600 serves to read the LCD barcode displayed on the mobile terminal 100. The shop client system 400 receives inputted data including a total amount to be settled and a member's password as well as the LCD barcode scanned by the scanner 600, and requests the bank server system 300 to identify the user and to settle the amount. Then, the shop client system 400 is notified of the result of the user's identification and the settlement authentication by the bank server system 300, performs the settlement transaction, and outputs a settlement slip to the user. The cash payment client system 500 receives inputted data including a total amount to be paid and a member's password as well as the LCD barcode scanned by the scanner 600, and requests the bank server system 300 to identify the user and to verify the possibility of cash payment. Then, the cash payment client system 500 is notified of the result of the user's identification and the result of the verification of the cash payment possibility by the bank server system 300, performs the cash payment, and outputs a payment statement to the user.

The mobile terminal 100 serves to store and display the LCD barcode data of the members received via wireless Internet and to transmit/receive various messages for wireless banking service in connection with the bank server system 300. Herein, the front part the LCD barcode data represents a designated bank. Therefore, a plurality of the barcodes representing different banks may be stored by the mobile terminal 100 and then the user may select one from these barcodes according to desired banks.

The computer 200 is used as a terminal unit for inputting member information data and transmitting related response messages upon member registration and log-on. Further, the computer 200 serves to receive all information and various messages in connection with the banking service transmitted from the bank server system 300.

Figure 2:
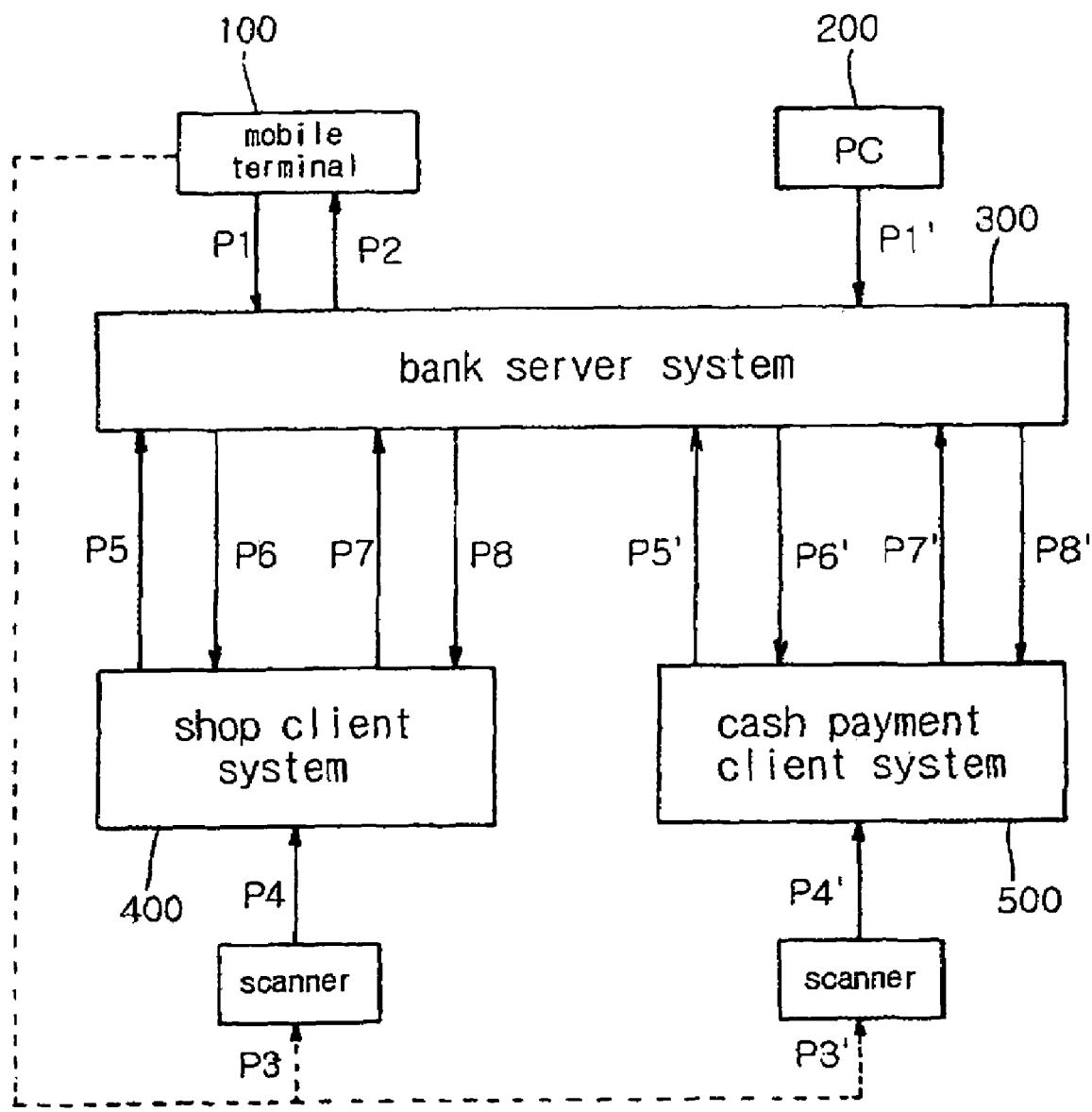
FIG. 2 is a flow chart of the electronic settlement system of FIG. 1.

FIG. 2 is a flow chart of the electronic settlement system of FIG. 1. With reference to FIG. 2, the arrows P1 and P1' show the member application, the arrow P2 shows the barcode transmission, the arrows P3 and P3' show the barcode scan, the arrows P4 and P4' show the input of the scanned barcode, the arrows P5 and P5' show the request for the user's identification, the arrows P6 and P6' show the result of the user's identification, the arrow P7 shows the request for the charge settlement, and the arrow P8 shows the result of the charge settlement. The arrow P7' shows the request for the cash payment and the arrow P8' shows the result of the cash payment.

Figure 3:
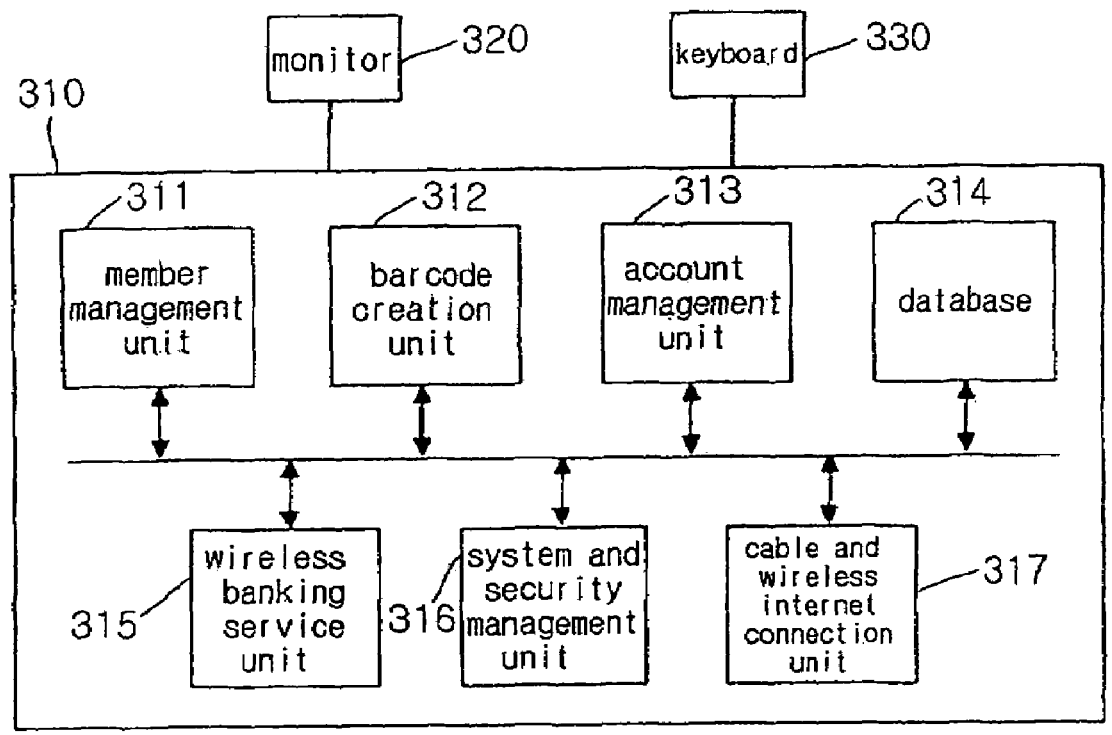
FIG. 3 is a schematic view of a bank server system in accordance with the present invention.

FIG. 3 is a schematic view of the bank server system 300 in accordance with the present invention. With reference to FIG. 3, the bank server system 300 has several functions, such as an account management function for credit card service, an account balance check function for small amount settlement service allowing the electronic settlement of traffic expenses and the use of a vending machine without coins, a deposit managing and balance check function for advance payment card service allowing the user to use an advance payment card charged with a designated amount of money. Further, the bank server system 300 has a cable and wireless banking service function. Via the cable and wireless banking service of the bank server system 300, the member receives services such as account checking and money transfer into other accounts, and various new product recommendations. In order to perform these functions, the bank server system 300 is connected to the computer 200, the shop client system 400, and the cash payment client system 500 via cable Internet, and to the member's mobile terminal 100 via wireless Internet.

The aforementioned bank server system 300 comprises a controller 310, a monitor 320, and a keyboard 330. The controller 310 controls the member management, the barcode creation, the account management, the database, and the security management functions. The monitor 320 outputs a screen by the control of the controller 310.

The controller 310 comprises a member management unit 311, a barcode creation unit 312, an account management unit 313, a database 314, a wireless banking service unit 315, and a cable and wireless Internet connection unit 317. The member management unit 311 manages registration and cancellation of membership. The barcode creation unit 312 creates a member's specific barcode. The account management unit 313 manages the whole transaction history of the member's account and verifies the member's settlement possibility upon receiving a request for the electronic settlement service from the shop client system 400. The database 314 stores and manages various data including member's information data, barcode data, account data, maintenance and management data relating to the system operation, and data for Internet banking services. The wireless banking service unit 315 performs wireless banking services and verifies the possibility of cash payment upon receiving a request for the cash payment service from the cash payment client system 500, and the cable and wireless Internet connection unit 317 performs cable and wireless Internet connection functions.

The member management unit 311 informs the users of a contract, a service introduction, a member registration procedure, etc. Upon the member registration, the member management unit 311 stores names, resident registration numbers, mobile terminal numbers, telephone numbers, addresses, genders, occupations, etc., inputted by the members, in the database 314. Upon the member cancellation, the member management unit 311 clears the database 314, including the above data of the member. Further, the member management unit 311 stores a history showing all services provided from the bank server system 300 to the member, and creates a congratulatory message and transmits it to the cable and wireless Internet connection unit 317 on a member's special occasion such as a birthday or a wedding anniversary. When the admission of the member is completed, the member management unit 311 requests the barcode creation unit 312 to create the member's specific barcode.

The barcode creation unit 312 receives the request for the member's specific barcode from the member management unit 311 and creates barcode data including a bank code and a check code. The created barcode is transmitted to the cable and wireless Internet connection unit 317.

The barcode, for example, consists of eighteen spaces. Herein, middle fourteen spaces create a member code corresponding to a member number, and then whether this member number is already used by the existing member is checked. The first two spaces create a bank code, and the last two spaces create a check code.

The account management unit 313 has a function of managing the transactions of the account of the member. When the member performs a money deposit or a money transfer from an account to another account, the account management unit 313 updates the balance of the member's account and stores the corresponding data in the database 314.

Further, upon receiving a request for the electronic settlement service from a shop, the account management unit 313 performs a function of verifying the member's settlement possibility. In case of the advance payment service, the account management unit 313 verifies whether the payment amount of the member is more than a limit, i.e., a predetermined limit of his/her advance payment card. If the payment of the member is more than the limit, the account management unit 313 notifies the member of a settlement impossible message via the network. Upon receiving a request for the balance check from the member management unit 311 or the wireless banking service unit 315, the account management unit 313 checks the database regarding to the account of the corresponding member and then notifies the member management unit 311 or the wireless banking service unit 315 of the balance condition.

A system and security management unit 316 serves to entirely maintain and manage the bank server system 300, to protect the bank server system 300 from being invaded by hackers, and to find out the invasions of the hackers. Further, the system and security management unit 316 serves to prevent the data conversion, which may occur at the time of transmitting and receiving the data via the network, and to authenticate the members.

The cable and wireless Internet connection unit 317 performs an Internet protocol function necessary upon the member registration/log-on and the Internet banking, and serves to transmit various messages for wireless banking services as well as the aforementioned barcode.

Figure 4:
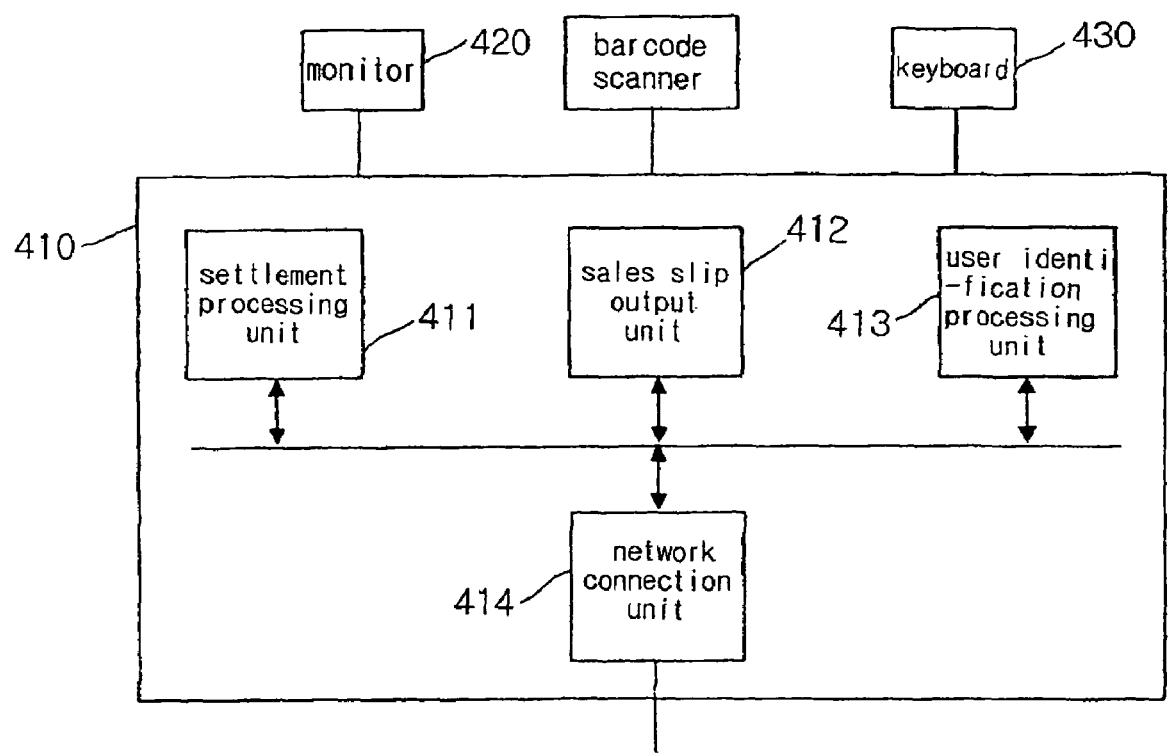
FIG. 4 is a schematic view of a shop client system in accordance with the present invention.

FIG. 4 is a schematic view of the shop client system 400 in accordance with the present invention. With reference to FIG. 4, the shop client system 400 is arranged at individual shops. The shop client system 400 performs various procedures and functions for the electronic settlement by the member. A barcode scanner for scanning the LCD barcode displayed on the member's mobile terminal is installed on the shop client system 400. The shop client system 400 comprises a shop controller 410, a monitor 420, and a keyboard 430.

The shop controller 410 comprises a settlement processing unit 411, a sales slip output unit 412, a user identification processing unit 413, and a network connection unit 414. The settlement processing unit 411 performs the settlement transaction according to the notification of the user identification. The sales slip output unit 412 outputs a sales slip. The user identification processing unit 413 identifies the user. The network connection unit 414 serves to be connected to Internet.

The user identification processing unit 413 outputs a message saying, "Input a password" on the monitor 420. Then, the member inputs his/her password via the keyboard 430. The user identification processing unit 413 transmits the password inputted by the member to the bank server system 300 via the network connection unit 414 and requests the bank server system 300 to identify the user. Based on the user identification result transmitted from the bank server system 300, the user identification processing unit 413 outputs a message saying "Input again a password" or "Settlement impossible". When the user is identified as the member, the user identification processing unit 413 notifies the settlement processing unit 411 of this fact.

Figure 6:
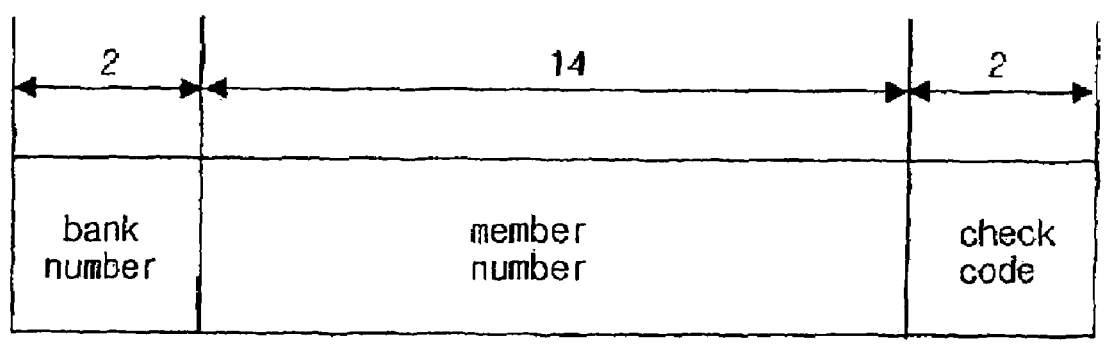
FIG. 6 is a schematic view showing one example of a barcode applied in the present invention.

The settlement processing unit 411 finds out a relevant bank, which issues the member's settlement account, using the first two spaces of the barcode data read by the barcode scanner 600 as shown in FIG. 6, and then determines a member code including sixteen spaces using the front two spaces and the middle fourteen spaces representing the member's number of the barcodes. Then, the settlement processing unit 411 outputs a message saying "Input a total amount to be settled using a keyboard". When a shop clerk inputs the total amount to be settled via the keyboard 430, the settlement processing unit 411 is connected to the relevant bank server system 300 using the member code via the network connection unit 414 and requests the bank server system 300 to check the balance on the member's account. When the bank server system 300 notifies the settlement processing unit 411 of the settlement possibility via the network connection unit 414, the settlement processing unit 411 notifies the user identification processing unit 413 that the user is actually an owner of the barcode. Then, when the user identification processing unit 413 notifies the settlement processing unit 411 of the user identification, the settlement processing unit 411 transmits the member number and the settlement amount to the sales slip output unit 412.

The sales slip output unit 412 serves to output the sales slip for signature by the member through a printer. After the member signs his/her name on the outputted sale slip, one sheet of the signed slips is given to the member and the remaining two sheets are stored by the shop.

Figure 5:
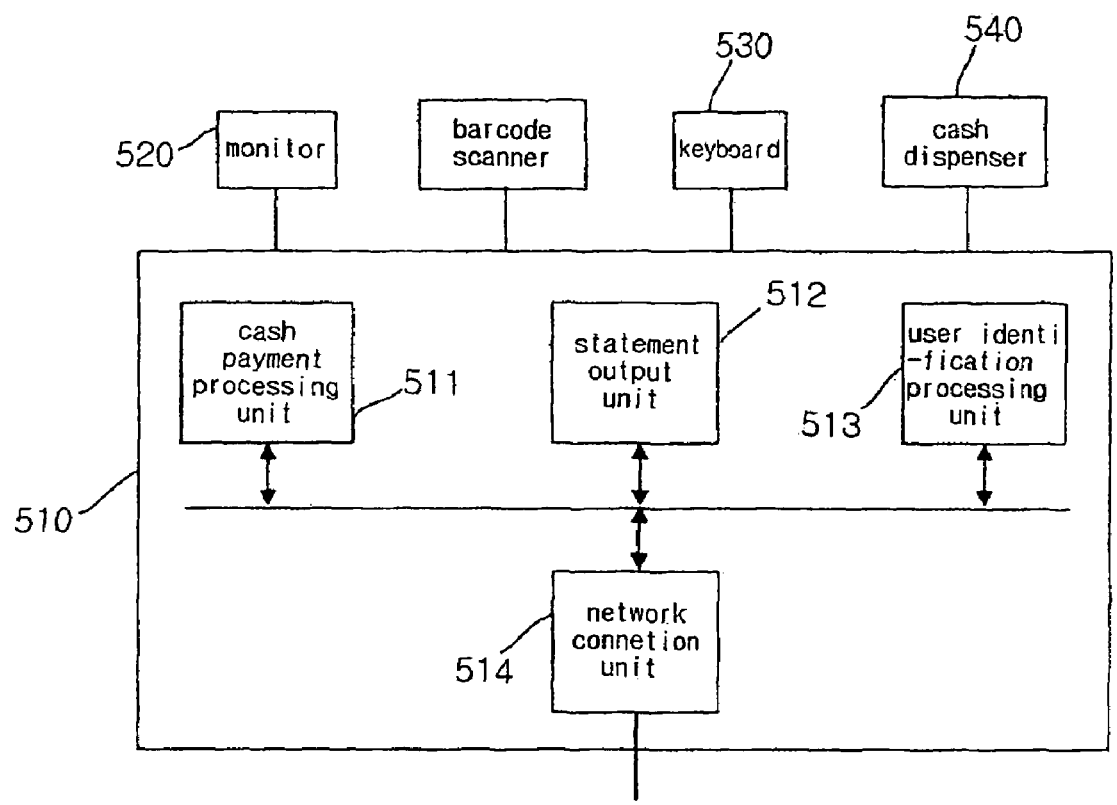
FIG. 5 a schematic view of a cash payment client system in accordance with the present invention.

FIG. 5 is a schematic view of the cash payment client system 500 in accordance with the present invention. With reference to FIG. 5, the cash payment client system 500 comprises a controller 510, a monitor 520, a keyboard 530, and a cash dispenser 540 for providing the corresponding amount of cash to the member according to the notification of cash payment possibility. The controller 510 comprises a cash payment processing unit 511 for processing the cash payment, a statement output unit 512 for outputting a detailed statement for payment, a user identification processing unit 513, and a network connection unit 514. The user identification processing unit 513 requests the bank server system 300 to identify the user, thereby performing the identification of the user. The network connection unit 514 connects the user identification processing unit 513 to Internet.

The cash payment processing unit 511 requests via the monitor 520 the member to input his/her password, and then transmits the inputted password by the keyboard 530 to the user identification processing unit 513. Further, the cash payment processing unit 511 receives the payment amount data inputted by the keyboard 530 and requests the corresponding bank server system 300 to check the member's account and the balance of the account via the network connection unit 514. Then, in case the cash payment is possible, the cash payment processing unit 511 notifies the cash dispenser 540 of the cash payment possibility.

The user identification processing unit 513 requests the bank server system 300 to verify whether the member number of the LCD barcode and the password are identical with the stored data of the bank server system 300 via the radio Internetwork by the network connection unit 514. In case the member number of the LCD barcode and the password are not identical with the stored data of the bank server system 300, the user identification processing unit 513 requests the user to input again his/her password or outputs a message saying "Unusable" on the monitor 520. On the other hand, in case the member number of the LCD barcode and the password are identical with the stored data of the bank server system 300, the user identification processing unit 513 notifies the cash payment processing unit 511 of this fact.

The barcode scanner 600 scans the LCD barcode including eighteen spaces displayed on the LCD window of the mobile terminal 100 as shown in FIG. 6 and decodes the sixteen spaces corresponding to the member code including the bank code and the member's number using the last two spaces corresponding to the check code. The barcode scanner 600 transmits the decoded barcode data to the shop client system 400 or the cash payment client system 500.

FIG. 6 is a schematic view showing an example of the barcode applied in the present invention. With reference to FIG. 6, even though the present invention uses a first dimensional barcode, the barcode is not limited to its code type. As shown in FIG. 6, the barcode of the present invention consists of eighteen bars defining individual decimal numbers. The first two bars serve to represent the bank code of the corresponding bank. Since one member usually possesses a plurality of bank cards, two bars are provided to recognize department cards and various services using barcodes as well as various bank cards. The middle fourteen bars represent the member number and serves to recognize the user as the member of each bank. The last two bars represent the check code for checking whether the barcode data is correct or not. Since except for the check code, total sixteen bars correspond to sixteen single numbers of a conventional credit card, the conventional bank card number may be directly changed to the barcode of the present invention.

Figure 7:
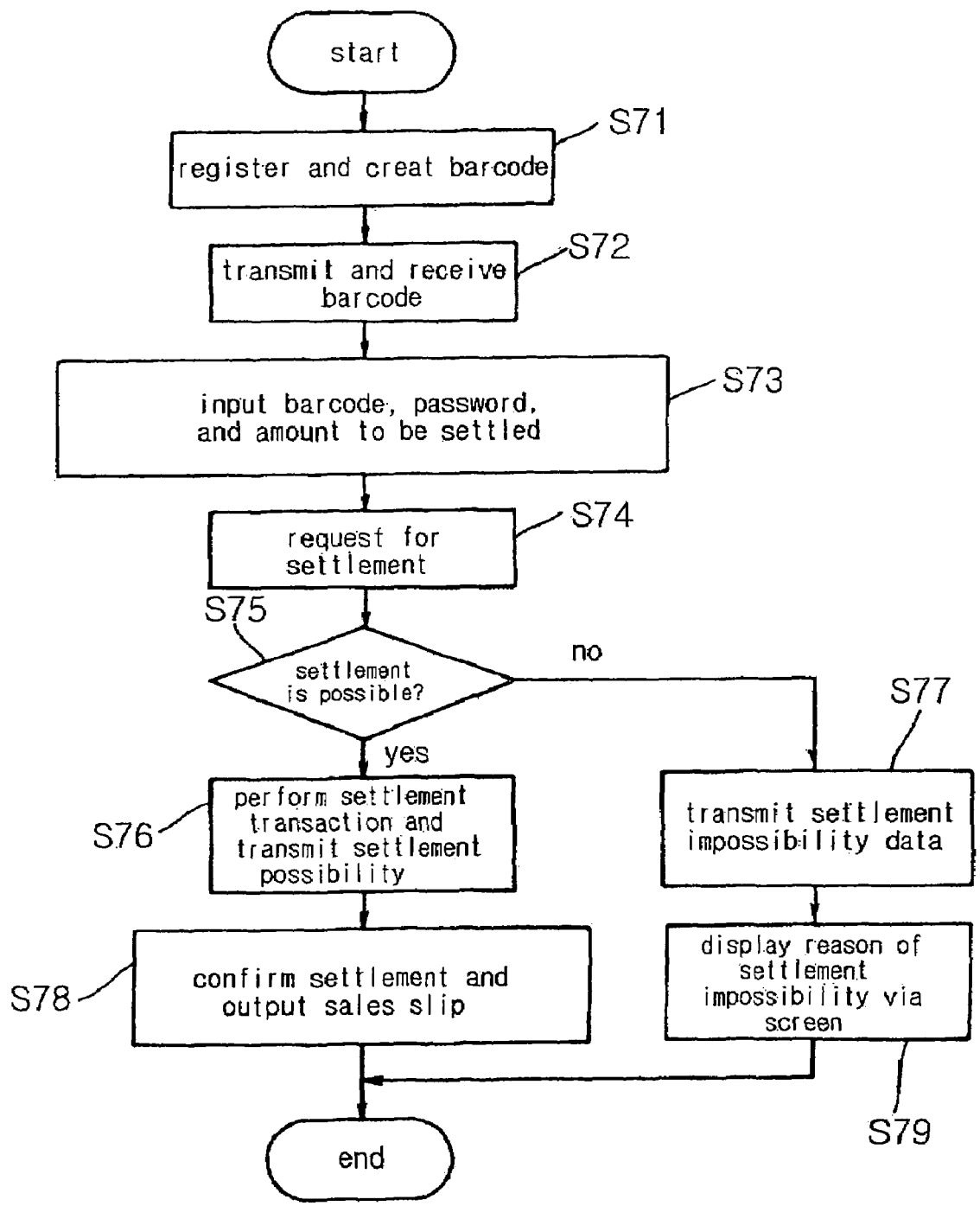
FIG. 7 is a flow chart of an electronic settlement method using a LCD barcode displayed on a mobile terminal in accordance with the present invention.
Figure 8:
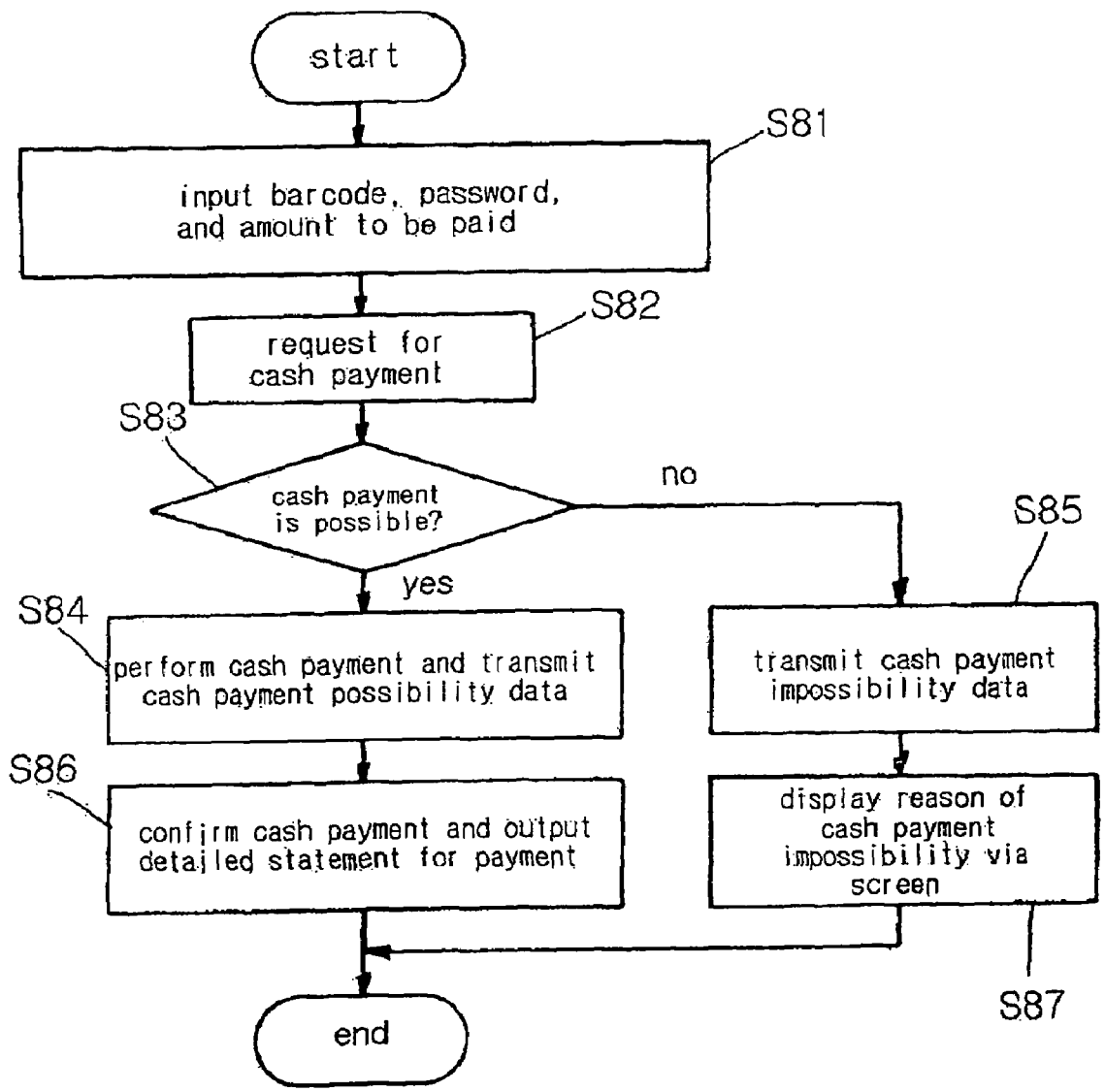
FIG. 8 is a flow chart of a cash payment method using a LCD barcode displayed on a mobile terminal in accordance with the present invention.

FIG. 7 is a flow chart of an electronic settlement method using the LCD barcode displayed on the mobile terminal in accordance with the present invention, and FIG. 8 is a flow chart of a cash payment method using the LCD barcode displayed on the mobile terminal in accordance with the present invention.

Hereinafter, the operation of the present invention will be described in detail with reference to the accompanying drawings.

With reference to FIGS. 1 to 7, the electronic settlement method and the cash payment method using the LCD barcode displayed on the mobile terminal of the present invention are described. In the step (a), a user is connected to the bank server system 300 via the computer 200 or the mobile terminal 100 and registers for the system 300 to become a member. Then, the bank server system 300 provides a specific barcode to the registered member. That is, in order to receive the electronic settlement service of the present invention, the user must register for the system as the member on-line or off-line. Herein, the on-line registration methods are divided into two types. One method uses the computer 200 and the other method uses the mobile terminal 100. When the user is registered as the member using the aforementioned methods, the bank server system 300 stores a member's information including a name, a resident registration number, a mobile terminal number, a telephone number, an address, gender, occupation, etc., in its internal database. Further, the bank server system 300 creates barcodes according to the members or the accounts, and transmits the created barcodes to the mobile terminals 100 of the corresponding members via wireless Internet, thereby displaying the barcodes on the LCD window of the mobile terminals 100 of the members.

More particularly, in order to register for the system to become a member, the user is connected to the bank server system 300 via the personal computer 200. Then, the member management unit 311 of the bank server system 300 informs the users of the contract, the service introduction, the member registration procedure, etc., and stores the names, the resident registration numbers, the mobile terminal numbers, the telephone numbers, the addresses, the genders, the occupations, etc., inputted by the members, in the database 314. Upon the member cancellation, the member management unit 311 clears the database 314, including the above data of the member. Further, the member management unit 311 stores a history showing all services provided from the bank server system 300 to the member, and creates a congratulatory message and then transmits it to the cable and wireless Internet connection unit 317 on a member's special occasion such as a birthday or a wedding anniversary, thereby more organically and systematically performing the member management.

When the registration of the member is completed, the member management unit 311 requests the barcode creation unit 312 to create the member's specific barcode. Herein, the barcode creation unit 312 receives the request for the member's specific barcode from the member management unit 311 and selects a member number consisting of sixteen single numbers. Whether the member number is already used by the existing member is checked. For example, since the first two bars represent the bank code, each bank may substantially set a member number including fourteen bars. After the last two bars are created as the check code, the barcode data consisting of eighteen bars as shown in FIG. 6 are created. (S71)

Next, in the step (b), the barcode conferred on each member is transmitted to the mobile terminal 100 of the corresponding member. That is, the created barcode is transmitted to the cable and wireless Internet connection unit 317 of the bank server system 300, and then the cable and wireless Internet connection unit 317 outputs the transmitted barcode to the mobile terminal 100 of the corresponding member via mobile communication network. Thereby, the registered member can use the barcode displayed on the LCD window of his/her mobile terminal 100.

After the member registration is completed, the account management is performed. Herein, the account management unit 313 of the bank server system 300 manages the transaction history of the account of the member, and all the changes of the account data are stored in the database 314. Via the above account management, the account management unit 313 performs the account check function, upon receiving a request for the account checking from the shop client system 400 or the cash payment client system 500. The account management is processed at any time. After the member registration and the account checking are completed, the barcode transmission is performed. Herein, the member management unit 311 of the bank server system 300 transmits the created barcode to the mobile terminal 100 of the newly registered member by the cable and wireless Internet connection unit 317.

Herein, the mobile terminal 100 of the member receives and stores the LCD barcode data of the member from the bank server system 300 via wireless Internet, and then, if necessary, exhibits the stored barcode on its LCD window. The mobile terminal 100 in connection with the bank server system 300 performs functions of transmitting and receiving various messages for wireless banking services. Particularly, since the front part the LCD barcode data represents the bank code, a plurality of the barcodes representing different banks may be stored by the mobile terminal 100 and then the user may select one from these barcodes according to desired banks.

As described above, the barcode transmitted from the bank server system 300 is received by the mobile terminal 100 of the member via wireless network, thereby performing the barcode transmission. The received barcode is stored by the mobile terminal 100 and then is exhibited for use at the shop or the cash dispenser. Since each bank has an identical barcode system, the member may store a plurality of the barcodes representing different banks in his/her mobile terminal 100 as many as his/her accounts. (S72)

Hereinafter, the electronic settlement method using the LCD barcode displayed on the mobile terminal in accordance with the present invention is described in detail.

In the step (c), the barcode stored by the mobile terminal 100 of the member, the password of the member, and the amount to be settled are inputted. That is, when the member wants to perform the electronic settlement, the member first selects a desired bank and exhibits the corresponding barcode on the LCD window his/her mobile terminal 100. The exhibited barcode is scanned by the barcode scanner 600 installed on a counter of the shop or a cash dispenser. That is, when the member exhibits the LCD barcode in order to receive the credit card service or the cash payment service, the LCD barcode is scanned by the barcode scanner 600 and then transmitted to the shop client system 400. Then, a member's password is inputted to the shop client system 400 by the keyboard 430. As described above, when the member wants to perform the electronic settlement, the scanned barcode data by the scanner 600 is transmitted to the settlement processing unit 411 of the shop client system 400 (S73).

Next, in the step (d), the shop client system 400 transmits barcode data, the member's password, and the total amount to be settled, inputted via Internet, to the bank server system 300 and requests the bank server system 300 to settle the total amount. That is, the settlement processing unit 411 find outs a corresponding bank using the first two numbers of the barcode data, i.e., the bank code, and then determines a member code including total sixteen numbers, using the first two numbers representing the bank code and the middle fourteen numbers representing the member's number of the barcodes. Then, the settlement processing unit 411 outputs a message saying "Input a total amount to be settled by a keyboard" on the monitor 420. Next, the settlement processing unit 411 of the shop client system 400 is connected to the corresponding bank server system 300 via the network connection unit 414 and requests the corresponding bank server system 300 to check the member' account and the balance on the member's account. (S74)

In the step (e), upon receiving the request for the electronic settlement from the shop client system, the bank server system 300 verifies the member's settlement possibility. In case the settlement is possible, the bank server system 300 performs the settlement and transmits settlement completion data to the requested shop client system 400. On the other hand, in case the settlement is impossible, the bank server system 300 transmits settlement impossibility data to the requested shop client system 400.

More specifically, the bank server system 300 performs several functions, such as an account management function for credit card service, an account balance check function for small amount settlement service allowing the electronic settlement of traffic expenses and the use of the vending machine without coins, a deposit managing and balance check function for advance payment card service allowing the user to use an advance payment card charged with a designated amount of money. Further, the bank server system 300 performs a cable and wireless banking service function for providing to the members services such as account checking and money transfer from an account to another account and introducing to the members various new products of the bank via radio or wireless network.

Upon receiving the request for the electronic settlement service from the shop client system 400, the account management unit 313 of the bank server system 300 performs the function of verifying the member's settlement possibility. When the settlement is possible, in case of the advance payment service, the account management unit 313 verifies whether the payment amount of the member is more than a limit, i.e., a predetermined limit of his/her advance payment card. In case the payment amount is not more than the limit, the account management unit 313 performs the settlement and notifies the requested shop client system 400 of a settlement result. On the other hand, in case the payment amount is more than the limit, the account management unit 313 notifies the shop client system 400 of a settlement impossible message via the network. Further, upon receiving the request for the balance check, the account management unit 313 checks the database regarding to the account of the corresponding member and then transmits the checked balance condition. (S75~S77).

Finally, in the step (f), in case the settlement completion data are transmitted to the requested shop client system 400, the shop client system 400 processes the settlement transaction. On the other hand, in case the settlement impossibility data are transmitted to the requested shop client system 400, the shop client system 400 displays the reason of the settlement impossibility via a screen.

When the shop client system 400 receives the settlement possibility message from the bank server system 300, the user identification processing unit 413 of the shop client system 400 verifies whether the user is an actual owner of the barcode. After the electronic settlement is completed via the user identification, the sales slip output unit 412 of the shop client system 400 outputs a sales slip for signature by the member through a printer.

In case the settlement is impossible due to bad credit or balance deficiency, the user identification processing unit 413 outputs a message saying "Input again a password" or "Settlement impossible" via the monitor based on the user identification result transmitted from the bank server system 300. (S78 and S79)

As described above, the sales slip output unit 412 serves to output the sales slip for signature by the member through the printer. After the member signs his/her name on the outputted sale slip, one sheet of the signed slips is given to the member and the remaining two sheets are stored by the shop.

Hereinafter, the cash payment method using the LCD barcode displayed on the mobile terminal in accordance with the present invention is described in detail.

With reference to FIGS. 1 to 8, the cash payment system of the present invention comprises the same steps (a) to (c) as the aforementioned electronic settlement method of the present invention. Therefore, the steps (a) to (c) of the cash payment system are omitted, and subsequent steps of the cash payment system are described below.

In the step (d), the cash payment client system 500 transmits the inputted barcode data, member's password, and total amount to be paid, to the bank server system 300 and requests the bank server system 300 to pay this amount. (S81 and S82)

The cash payment client system 500 performs various procedures and functions for providing the cash payment service. Similarly to the aforementioned shop client system 400, when a member wants to perform the cash payment, the member exhibit his/her LCD barcode on the LCD window his/her mobile terminal 100. The exhibited barcode is scanned by the barcode scanner 600. The barcode scanner 600 transmits the scanned LCD barcode to the cash payment processing unit 511 of the cash payment client system 500.

Herein, the cash payment processing unit 511 requests via the monitor 510 the member to input his/her password, and then transmits the inputted password by the keyboard 530 to the user identification processing unit 513. The user identification processing unit 513 of the cash payment client system 500 is connected to the corresponding bank server system 300 via radio Internetwork by the network connection unit 514 and requests the corresponding bank server system 300 to verify whether the member number of the LCD barcode and the password are identical with the stored data of the bank server system 300.

Next, the cash payment processing unit 511 receives the amount to be paid, inputted by the keyboard, and requests the bank server system 300 to check the member' account and the balance on the member's account via the network connection unit 514.

In the step (e), upon receiving the request for the cash payment from a cash payment client system 500, the bank server system 300 verifies the member's cash payment possibility. In case the cash payment is possible, the bank server system 300 transmits cash payment possibility data to the requested cash payment client system 500. On the other hand, in case the cash payment is impossible, the bank server system 300 transmits cash payment impossibility data to the requested cash payment client system 500. (S84 and S85)

Finally, in the step (f), in case the cash payment possibility data are transmitted to the requested cash payment client system 500, the cash payment client system 500 processes the cash payment and outputs a detailed statement for payment.

On the other hand, in case the cash payment impossibility data are transferred to the requested cash payment client system 500, the cash payment client system 500 displays the reason of the settlement impossibility via a screen. More specifically, in case the member number of the LCD barcode and the password are not identical with the stored data of the bank server system 300, the user identification processing unit 513 of the cash payment client system 500 requests the member to input again his/her password or outputs a message saying "Unusable" on the monitor 520. On the other hand, in case the member number of the LCD barcode and the password are identical with the stored data of the bank server system 300, the user identification processing unit 513 notifies the cash payment processing unit 511 of this fact. Then, the cash payment processing unit 511 requests the member to input the amount of cash to be paid, and in case the cash payment is possible, gives the member cash of the inputted amount via the cash dispenser 540. (S86 and S87)

Herein, the statement output unit 512 outputs the detailed statement for payment. After the electronic settlement is completed via the user identification, the cash payment processing unit 511 gives the member the corresponding cash via the cash dispenser 540 and outputs the detailed statement including payment data via statement output unit 512, thereby providing the cash payment service.

In accordance with the above-described present invention, the members perform the settlement transaction at shops or the cash payment using the mobile terminal.

As described above, the present invention provides an electronic settlement system, an electronic settlement method, and a cash payment method using a LCD barcode displayed on a mobile terminal, thereby providing electronic settlement services to the members at shops by transmitting a member's specific barcode from a bank to a member's mobile terminal via wireless network and using the barcode, small amount settlement services for settling traffic expenses and for use of a vending machine without coins, advance payment card services by depositing a designated amount of money at a database of the bank and allowing the user to systematically use the advance card within the deposited money, and wireless banking services for transmitting and receiving various banking related data via wireless network between the bank and the members. Therefore, the electronic settlement system of the present invention safely and synthetically performs various credit card services and banking services only with the mobile terminal.

INDUSTRIAL APPLICABILITY

As apparent from the above description, the present invention provides an electronic settlement system, an electronic settlement method, and a cash payment method using a LCD barcode displayed on a mobile terminal. The present invention has many advantages as follows.

1. The electronic settlement system of the present invention uses a portable mobile terminal, thereby removing the conventional inconvenience in possession of numerous credit cards.

2. Barcode data transmitted from individual banks are stored by the mobile terminal, thereby simplifying the management compared to the conventional system with a plurality of cards.

3. The electronic settlement system of the present invention uses LCD barcodes instead of the conventional magnetic cards, thereby reducing the cost in producing the cards.

4. The conventional magnetic credit card for credit card service was easily lost by carelessness of a user, and a long time is required to reissue a new credit card. The electronic settlement system of the present invention eliminates the possibility of loss and provides a swift service.

5. The conventional IC card for smart card service with an electronic currency function must be recharged after completely spending the stored money. The electronic settlement system of the present invention eliminates this requirement and provides a convenience.

6. The conventional magnetic credit card cannot be connected via network. On the other hand, since the mobile terminal employed by the electronic settlement system of the present invention transmits and receives various messages, the present invention performs various banking services.

7. The small amount settlement service of the smart card service and the credit card service can be integrated as the electronic settlement system of the present invention.

8. The electronic settlement system of the present invention performs additional services relevant to customer management as well as settlement services in department stores.

9. The electronic settlement system of the present invention is connected to a customer management system for providing tickets, coupons, and other customer card services using LCD barcodes of the mobile terminal, thereby allowing the users to simply and conveniently use the system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electronic settlement system using a barcode stored in a mobile terminal, comprising:
   a mobile terminal to receive a liquid crystal display (LCD) barcode via wireless Internet, and to store and display the LCD barcode;
   a bank server system to create the LCD barcode for a member, to store the LCD barcode into a database, to transmit the LCD barcode to a corresponding mobile terminal upon member registration, and to transmit a result of user's identification and a settlement authentication upon receiving a request for user's identification and settlement;
   a barcode scanner to read the LCD barcode displayed by the mobile terminal; and
   a shop client system to transmit the user's identification and settlement data including a total amount to be settled and a member's password as well as the read LCD barcode to the bank server system, to request the bank server system to identify the user and to settle the amount, to receive the result of the user's identification and the settlement authentication from the bank server system, to perform a settlement transaction if the settlement authentication from the bank server system is approved, and to output a settlement slip.

2. The electronic settlement system as set forth in claim 1, wherein the shop client system comprises:
   a shop controller;
   a monitor to output processing conditions and results; and
   a keyboard to enable key-inputting data including the member's password;
   said shop controller including:
      a settlement processing unit to perform the settlement transaction according to the result of the user identification;
      a sales slip output unit to output the settlement slip;

a user identification processing unit to identify a user; and a network connection unit to perform an Internet connection function.

3. The electronic settlement system as set forth in claim 1, further comprising:

a cash payment client system to transmit cash payment data including a total amount to be paid and the member's password as well as the read LCD barcode to the bank server system, to request the bank server system to identify the user and to verify possibility of cash payment, to receive the result of the user's identification and a result of verification of the cash payment possibility from the bank server system, to perform a cash payment transaction, and to output a detailed statement for payment.

4. The electronic settlement system as set forth in claim 1, wherein the bank server system comprises:

a controller to control member management, barcode creation, account management, database and security management functions;

a monitor to output a screen by control of the controller; and a keyboard to enable key-inputting of data;

said controller including:

a member management unit to manage registration and cancellation of the member;

a barcode creation unit to create the member's LCD barcode;

an account management unit to manage a transaction history of a member's account and to determine a result of the member's settlement authentication upon receiving a request for the electronic settlement service from the shop client system;

a database to store and manage data including member's information data, barcode data, account data, maintenance and management data relating to system operation, and data for Internet banking services;

a wireless banking service unit to perform wireless banking services and to verify a possibility of cash payment upon receiving a request for a cash payment service from a cash payment client system; and a cable and wireless Internet connection unit to perform cable and wireless Internet connection functions.

5. The electronic settlement system as set forth in claim 4, wherein the account management unit verifies whether the total amount to be settled is more than a predetermined limit of the member upon receiving the request for the electronic settlement service.

6. The electronic settlement system as set forth in claim 4, wherein the barcode creation unit of the bank server system creates a different LCD barcode for each account of the member.

7. The electronic settlement system as set forth in claim 3, wherein the cash payment client system comprises:

a controller;

a monitor to output processing conditions and results;

a keyboard to enable key-inputting the member's password and the amount to be paid; and a cash dispenser to dispense a corresponding amount to the member according to the result of verification of the cash payment possibility;

said controller including:

a cash payment processing unit to process the cash payment according to the result of the user identification;

a statement output unit to output the detailed statement for payment;

a user identification processing unit to request the user identification and to verify the user's identification; and a network connection unit to connect the user's identification processing unit to Internet.

8. The electronic settlement system as set forth in claim 5, wherein the barcode creation unit of the bank server system creates a different barcode for each account of the member.

* * * * *